Jan. 8, 1952 W. S. POWERS, JR 2,581,879
BOTTLE SPINNER
Filed Dec. 31, 1948 2 SHEETS—SHEET 1

Inventor:
Whitney S. Powers, Jr.,
By Cushman Darby Cushman
ATTORNEYS.

Jan. 8, 1952 W. S. POWERS, JR 2,581,879
BOTTLE SPINNER
Filed Dec. 31, 1948 2 SHEETS—SHEET 2
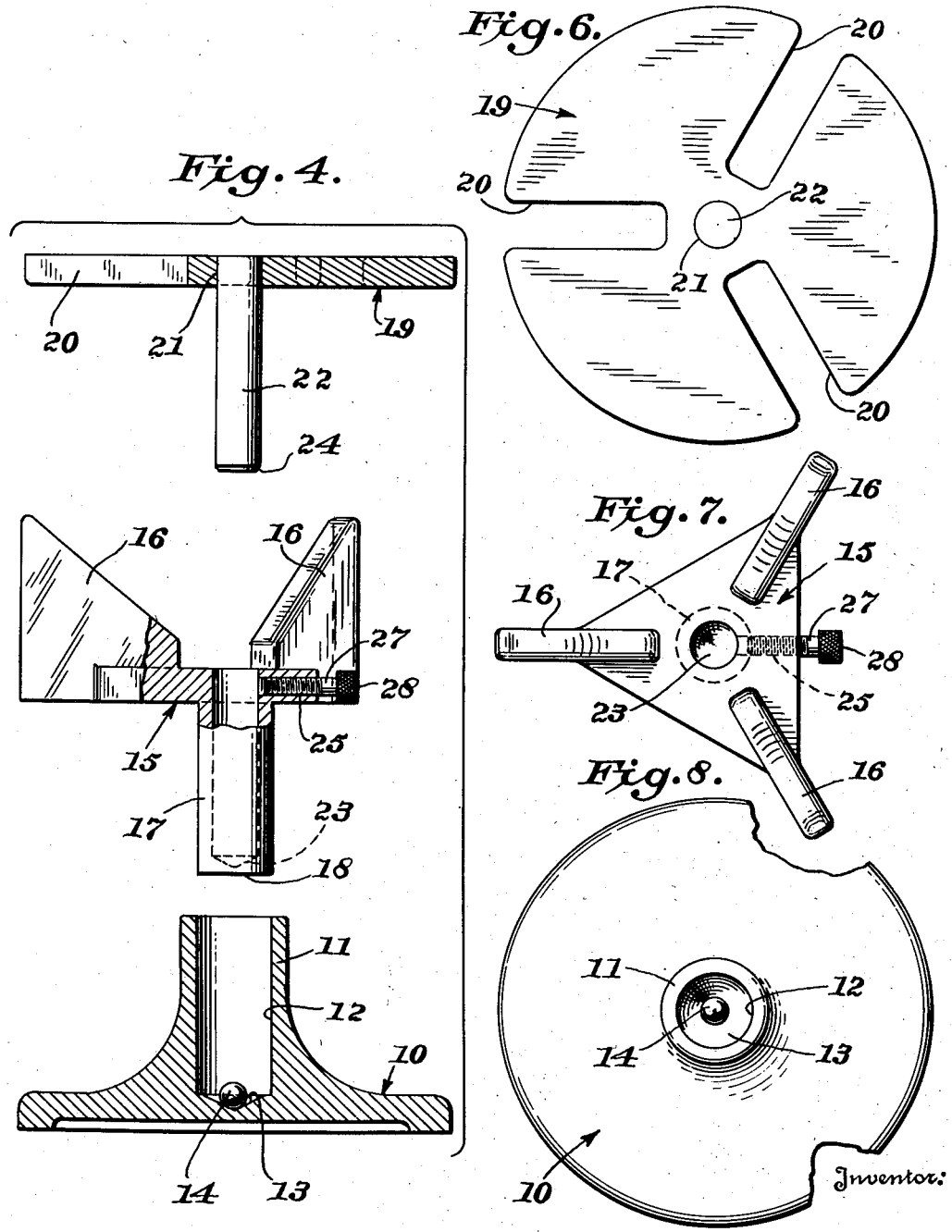
Inventor:
Whitney S. Powers, Jr.,
ATTORNEYS.

Patented Jan. 8, 1952

2,581,879

UNITED STATES PATENT OFFICE 2,581,879

BOTTLE SPINNER

Whitney S. Powers, Jr., Elmira, N. Y., assignor to Thatcher Glass Manufacturing Company, Inc., Elmira, N. Y.

Application December 31, 1948, Serial No. 68,702

3 Claims. (Cl. 248—349)

The present invention relates to a new and improved spinner for testing glass bottles.

Heretofore, in the testing of glass bottles, each bottle was placed on a spinner table which rotated about a central spindle when manually actuated. The bottle had to be centered up visually or by means of interchangeable insert cups made for each size and type of bottle to be tested, or centered by three or more independent slotted fingers held in position by cap screws which had to be set independently of one another each time a different size bottle was tested in order to bring the bottle into alignment with the vertical axis of the spinner.

An important object consists in providing a simple, efficient and economical spinner device provided with means for facilitating the inspection of glass bottles and the like for determining their perpendicular trueness and other miscellaneous glass defects, and wherein any size or diameter bottle can be accommodated and centered quickly and accurately by adjustment of means which fixes the vertical height and the center of the spinner table upon which the base of the bottle rests, and which also fixes the position of the bottle radially with respect to the center axis of the spinner table by point confinement against spaced sloping and accurately centered lands or guards which are maintained in a fixed position relative to the table and project upwardly through radial slots formed in the table.

Other objects and advantages of the invention will become apparent from the following description when taken in conjunction with the accompanying claims and drawings.

Referring to the drawings in which is shown a preferred embodiment of the spinner device:

Figure 4 is an exploded view of the several parts of the spinner assembly.

Figure 6 is a detail plan view of the spinner table.

Figure 7 is a detail plan view of the member which carries the centering lands, and Figure 8 is a plan view of the base of the device.

Figure 1:
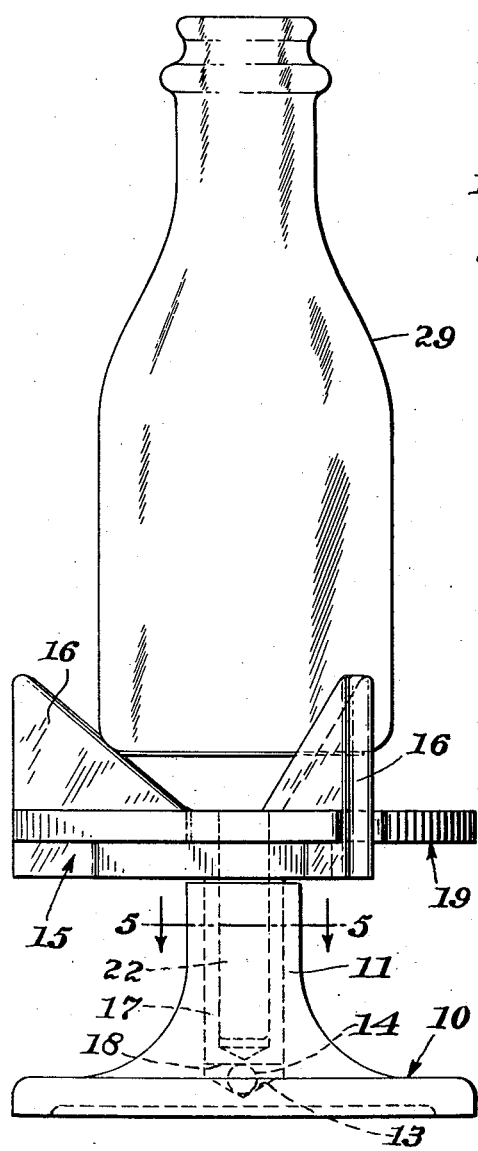
Figure 1 is a side elevation of the spinner with a bottle to be tested mounted thereon.
Figure 3:
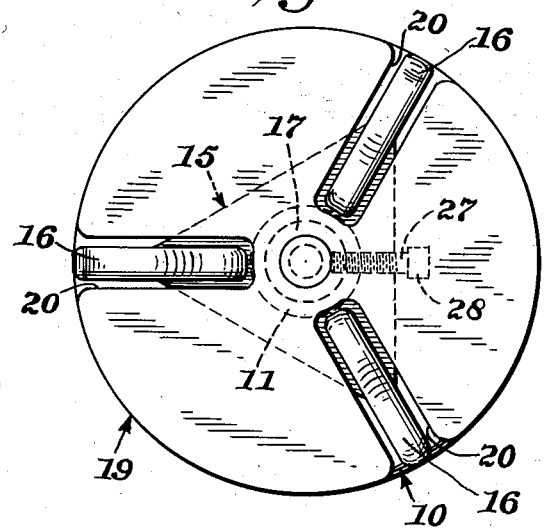
Figure 3 is a plan view of the device shown in Figure 1 with the bottle removed.

Referring to the drawings in which like numerals indicate like parts in the several views, the spinner assembly includes a relatively fixed base 10 which is shown of circular shape and which obviously may be of any desired size, as the particular operating conditions may require. The base 10 has extending upwardly and centrally therefrom, a hollow portion 11 forming a vertical recess 12 (Fig. 4). The bottom wall 13 of the recess is preferably of conical shape and is arranged to receive a metal ball 14, the purpose of which will subsequently be described. A flat member 15 preferably of triangular shape (Fig. 7) may be provided with three or more spaced upwardly projecting inclined lands or webs 16 constructed and arranged as shown in Figure 4, so as to receive the bottom or lower edge of the bottle when the latter is mounted on the device. The member 15 has a depending centrally disposed tubular portion or sleeve 17 provided with a straight or flat bottom 18 arranged to bear against the ball 14 in the recess 12 when the parts are set up. A spinner table 19, preferably of circular shape (Fig. 6), is provided with radial slots 20 corresponding in number to the number of inclined lands 16 on the member 15 and through which the lands extend when the parts are assembled. The table 19 has a central opening 21 into which extends the upper end of a shaft or spindle 22 that is secured to the wall of the opening in any suitable manner such as by a press fit or the like. The rotatable sleeve 17 of the member 15 is of such length as to receive the stem or shaft 22 of the table 19, and the bottom or inner wall 23 of the sleeve 17 may be inclined and spaced below the tapered lower end portion 24 of the stem 22 when the table 19 is in its lowermost position (Fig. 1). The tapered portion 24 serves to facilitate the insertion of the stem 22 into the sleeve 17. The web member 15 between two adjacent lands 16 is provided with a radial threaded opening 25 for receiving a threaded thumb screw 27 that has a knurled head 28 for facilitating its manual operation. The inner end of the screw 27 is arranged to be moved into frictional engagement with the stem or shaft 22 of the table 19 in order to maintain the same in any desired adjusted position to control the axial movement of the stem 22 in the sleeve 17.

Figure 2:
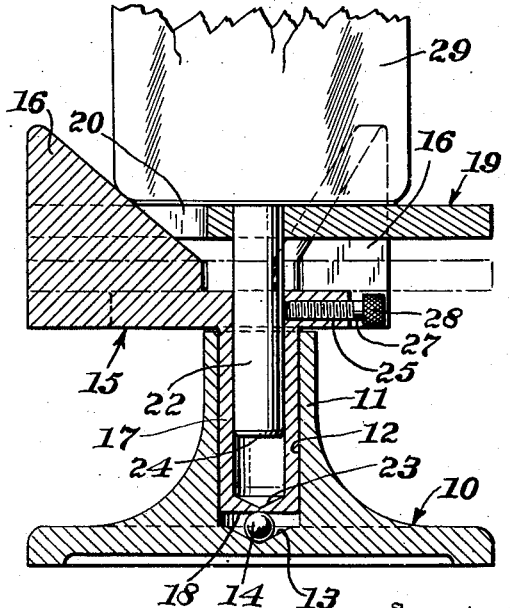
Figure 2 is a detail vertical sectional view showing the table raised to supporting position after the bottle has been centered by the lands on the device.
Figure 5:
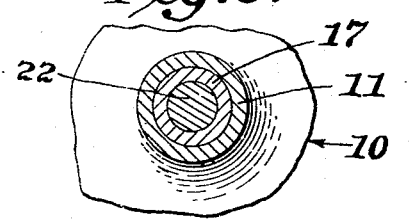
Figure 5 is a sectional view taken along the line 5—5 of Figure 1.

In operation, assuming a glass bottle 29 (Fig. 1) is to be tested by the spinner assembly, the bottle is initially centered on the inclined sides of the three spaced lands 16. The set screw 27 is then loosened and the table 19 moved upwardly so as to engage and support the bottom of the bottle (Fig. 2). The thumb screw is then tightened so as to firmly engage the stem 22 in order to maintain the table in its fixed adjusted position. By reason of the initial centering of the bottle 29 by the lands 16 and moving the table 19 so as to support the bottle, it will be seen that simple and efficient means are provided wherein any size or diameter bottle can be accommodated and centered quickly and accurately by the vertical adjustment of the table 19 through the thumb screw 27 in order to fix the height vertically of the centering or floating table 19 upon which the bottle rests, and also fix the position of the bottle radially with respect to the center axis of the spinner by point confinement against the inclined sides of the lands 16 which are accurately centered and maintained in a fixed position relative to the table 19.

The member 15 is rotatably supported on the base 10 by the depending sleeve 17 and the bottom of the sleeve (Fig. 2) bears against the ball bearing 14 so as to reduce frictional resistance and facilitate turning of the sleeve within the recess or socket 12. As the stem 22 of the table 19 is axially or vertically adjustable within the sleeve 17 and is arranged to be maintained in a fixed position relative to the lands 16 by the set screw 27, it will be seen that the bottle 29, irrespective of its size or diameter, is supported centrally of the spinner in all positions of adjustment, and that the bottle 29, table 19, and member 15 are freely rotatable on the base 10 to provide easy and convenient operable means for accurately positioning the bottle on the spinner and for rotating the bottle in order to quickly test the same. It will also be observed that the bottle 29 is confined to the center of the table 19 by the inclined lands or guards 16 so that the bottle rests on the table within a circle having its center at the vertical axis of the spinner assembly, thus providing means for permitting quick inspection of commercial glass bottles and the like for testing their perpendicularity and other defects.

It will be understood that the form of the invention shown and described is merely illustrative and that such changes may be made as fall within the purview of one skilled in the art without departing from the spirit of the invention and the scope of the following claims.

I claim:

1. A bottle spinner of the class described including a base having a vertically disposed recess extending upwardly therefrom, a revoluble member having a depending sleeve rotatably mounted in said recess, a spinner table having a depending stem vertically slidable in said sleeve, said table having spaced radial slots, said member having spaced inclined means extending upwardly through said slots for engaging and centering a bottle to be tested, said table when the bottle engages said inclined means being movable upwardly to engage and support the bottom of the bottle, and means for maintaining the table and stem in an adjusted vertical position relative to said member so that the table may be moved to support the bottle irrespective of the size and diameter of the bottle.

2. A bottle spinner of the class described including a base having a centrally and vertically disposed recess, a rotatable member having a centrally depending sleeve extending into said recess and rotatably mounted therein, said member having circumferentially spaced inclined lands extending upwardly therefrom for engaging and centering a glass bottle to be tested, a spinner table above said member and having radially spaced slots through which said lands extend, said table having a centrally depending stem extending into said sleeve, said table when the bottle engages said inclined lands being movable upwardly to engage and support the bottom of the bottle, and means for adjustably connecting the stem to the sleeve so as to maintain the table in a fixed vertical position relative to said member, said lands constituting means for confining the bottle to the center of the table irrespective of the size and diameter of the bottle.

3. A bottle spinner of the class described including a base having a centrally and vertically disposed recess, a rotatable member having a centrally depending sleeve extending into said recess and rotatably mounted therein, said recess having a ball bearing in the bottom thereof engaging said sleeve for facilitating rotation of the sleeve in said recess, said member having circumferentially spaced inclined lands extending upwardly therefrom for engaging and centering a glass bottle to be tested, a spinner table above said member and having radially spaced slots through which said lands extend, said table having a centrally depending stem extending into said sleeve, said table when the bottle engages said inclined lands being movable upwardly to engage and support the bottom of the bottle, and means for adjustably connecting the stem to the sleeve so as to maintain the table in a fixed vertical position relative to said member, said lands constituting means for confining the bottle to the center of the table irrespective of the size and diameter of the bottle.

WHITNEY S. POWERS, Jr.

REFERENCES CITED

The following references are of record in the file of this patent:

UNITED STATES PATENTS

| Number | Name | Date |
|---|---|---|
| 1,161,762 | Bartlett | Nov. 23, 1915 |
| 2,486,932 | Elliott | Nov. 1, 1949 |